United States Patent
Lai et al.

(10) Patent No.: US 6,470,097 B1
(45) Date of Patent: Oct. 22, 2002

(54) TOTAL VARIATIONAL BLIND IMAGE RESTORATION FROM IMAGE SEQUENCES

(75) Inventors: Shang-Hong Lai, Plainsboro, NJ (US); Yuntao Cui, Pittsburgh, PA (US)

(73) Assignee: Siemens Corporation Research, Inc., Princeton, NJ (US)

( * ) Notice: Subject to any disclaimer, the term of this patent is extended or adjusted under 35 U.S.C. 154(b) by 0 days.

(21) Appl. No.: 09/235,998

(22) Filed: Jan. 22, 1999

(51) Int. Cl.$^7$ .................................................. G06K 9/36
(52) U.S. Cl. ........................................ 382/255; 382/236
(58) Field of Search ................................ 382/254–255, 382/107, 236

(56) References Cited

U.S. PATENT DOCUMENTS

| | | | | |
|---|---|---|---|---|
| 5,440,647 A | * | 8/1995 | Floyd, Jr. et al. | 382/132 |
| 5,576,548 A | * | 11/1996 | Clarke et al. | 250/369 |
| 5,978,505 A | * | 11/1999 | Sutton et al. | 382/156 |
| 6,169,817 B1 | * | 1/2001 | Parker et al. | 382/131 |
| 6,317,519 B2 | * | 11/2001 | Dusseux | 382/237 |

* cited by examiner

Primary Examiner—Thomas D. Lee
Assistant Examiner—Stephen Brinich
(74) Attorney, Agent, or Firm—Donald B. Paschburg (57) ABSTRACT

A blind image restoration system uses total variational (TV) regularization to allow discontinuities in a true image function. The system first updates image blur parameters to minimize the energy function with the motion parameters and restored image. The motion parameters between subsequent frames in the image sequence are then updated to minimize the energy function with the blur parameters and restored image. The restored image is then updated by using a preconditioned conjugate gradient algorithm to minimize the energy function derived from the TV regularization formulation. The TV-based energy function is then computed by using the currently updated parameter values. If the relative difference between the current energy function value and the energy value computed in the previous iteration is within a threshold, then it is converged and the restored image is outputted. If it has not converged, the signal flows back to update the parameters.

18 Claims, 7 Drawing Sheets

ND IMAGE
TOTAL VARIATIONAL BLIND IMAGE RESTORATION FROM IMAGE SEQUENCES

BACKGROUND OF THE INVENTION

1. Field of the Invention

The present invention relates to image restoration and more particularly to applying total variational regulation to a blind image.

2. Description of the Prior Art

Digital image restoration has received considerable attention in the field of image processing and computer vision during the past two decades. It contains applications in astronomial imaging, X-ray and MRI medical imaging, degraded media (film or videotape) restoration, artifact removal in image coding, law enforcement, etc. The problem of image restoration with known blur functions has been well studied in the past. Inverse filtering and regularized least squares are two of the most popular approaches for this problem. These are further described by M. R. Banham and A. K. Katsaggelos, in "Digital Image Restoration", IEEE Signal Processing Magazine, Vol. 14, No. 2, pp. 24–41, 1997; and by A. K. Katsaggelos in Digital Image Restoration, Springer-Verlag, New York, 1991. Recently, researchers have focused on the more challenging problem, which is to recover the true image together with the blur function from the degraded image. This problem is called blind image restoration or blind image deconvolution. This problem is more practical since the blur function is usually unknown for most cases. D. Kundur and D. Hatzinakos in "Blind Image deconvolution", IEEE Signal Processing Magazine, Vol. 13, No.3, pp. 43–64, 1996, gave a review of previous methods, which include methods based on the frequency domain zeros in the PSF (point spread function) and the methods based on representing the blurred image as an ARMA (autoregressive moving average) process. The point spread function is further described by T. G. Stockham Jr., T. M. Cannon, and R. B. Ingebresten in "Blind Deconvolution Through Digital Signal Processing", Proc. IEEE, Vol. 63, pp. 678–692, 1975; and by R. L. Lagendijk, A. M. Tekalp, and J. Biemond in "Maximum Likelihood Image And Blur Identification", Optical Engineering, Vol. 29, No.5, pp. 422–435, 1990. The autoregressive moving average is further described by A. M. Tekalp, H. Kaufman, and J. Woods in "Identification Of Image And Blur Parameters For The Restoration Of Noncausal Blurs", IEEE Trans. Acoust., Speech, Signal Processing, Vol. 34, pp. 963–972, 1986; and by K. T. Lay and A. K. Katsaggelos in "Image Identification And Restoration Based On Expectation-maximization Algorithm", Optical Engineering, Vol. 29, No. 5, pp. 436–445, 1990. The methods based on the frequency domain zeros are restricted to some specific types of blurs, such as motion blurs or defocused blurs with a circular aperture. In addition, these methods are sensitive to the additive noises. The methods based on the ARMA model are suspensible to some artifact in the restored image due to the artificial assumption that the true image is a two-dimensional autoregressive (AR) process.

More recently, Y.-L. You and M. Kaveh in "A Regularization Approach To Joint Blur Identification And Image Restoration", IEEE Trans. Image Processing, Vol. 5, No. 3, pp. 416–428, 1996 developed a regularization approach for the blind image restoration problem, which is an ill-posed inverse problem due to the fact that the solution is not unique. Their regularization approach imposes additional smoothness constraint on the true image as well as the blur function, thereby making the problem well posed. This leads to an image-blur coupled function optimization problem. An alternating minimization algorithm with the conjugate gradient iterations was proposed to solve this coupled optimization problem.

You and Kaveh's regularization formulation used an $H^1$ norm for the smoothness constraint on the image and the blur. This smoothness constraint prohibits discontinuities in the solution. Unfortunately, there usually exist sharp discontinuities in the true images. The desirable details of the true image can be lost due to the smoothed discontinuities. Although You and Kaveh proposed a weighted regularization to alleviate this problem, this weighting scheme is somehow ad hoc and the parameters involved in this scheme may need to be tuned in a case by case basis.

A new regularization approach that employed the total variation (TV) norm in stead of the standard $H^1$ norm for the image constraint was proposed by L. Rudin, S. Osher, and E. Fatemi in "Nonlinear Total Variation Based Noise Removal Algorithms", Physica D., Vol. 60, pp. 259–268, 1992 for the image denoising problem. The TV regularization has been proved to be capable of preserving discontinuities while imposing smoothness constraints and it is effective for recovering blocky images. T. F. Chan and C. K. Wong in "Total Variation Blind Deconvolution", IEEE Trans. Image Processing, Vol. 7, No. 3, pp. 370–375, 1998 modified You and Kaveh's regularization formulation by using the TV norm for the smoothness constraint on the image as well as the blur function instead of the $H^1$ norm, thus preserving the discontinuities in the recovered image function.

SUMMARY OF THE INVENTION

The present invention provides a new formulation for blind image restoration from an image sequence. Total variational (TV) regularization is employed to allow discontinuities in a true image function. An iterative alternating algorithm using quasi-Newton iterations is provided to solve an image-blur coupled nonlinear optimization problem. This formulation is then extended to the blind image restoration from an image sequence by introducing motion parameters into a multi-frame data constraint.

The input to the blind image restoration system of the present invention contains an image sequence and initial values for image blur and motion parameters. Within an image blur parameters updater, the system first updates the image blur parameters by using Quasi-Newton iterations to minimize the energy function with the motion parameters and restored image, fixed with their current values. After that, the signal flows to a motion parameters updater where the motion parameters between subsequent frames in the image sequence are updated by using Newton iterations to minimize the energy function with the blur parameters and restored image, fixed with their current values. The restored image is then updated in a restored image updater by using a preconditioned conjugate gradient algorithm to minimize the energy function derived from the total variational (TV) regularization formulation. The TV-based energy function is then computed in a TV-based energy function computer by using the currently updated parameter values. Within a converged decider, if the relative difference between the current energy function value and the energy value computed in the previous iteration is within a threshold, then it is converged and the restored image is outputted. If it has not converged, the signal flows back to the image blur parameters updater to update the parameters.

BRIEF DESCRIPTION OF THE DRAWINGS

FIG. 2 illustrates a triangular image example with FIG. 2(a) illustrating an original image.

FIG. 5 illustrates a real license plate sequence example with FIG. 5(a) illustrating one frame from a car sequence.

DETAILED DESCRIPTION OF THE INVENTION

Blind image restoration recovers the original images from the blurred images when the blurring function in the image formation process is unknown. The present invention provides an efficient and practical, blind image restoration system based on total variational (TV) regularization. The TV regularization employs TV norm on the images for the smoothness constraint, while the traditional regularization uses $H^1$ norm for the smoothness constraint. The TV regularization provides a larger functional space for the image functions and is known for allowing discontinuities in the image function to be recovered. The blur functions considered in this paper are combinations of a Gaussian defocus blur and a uniform motion blur and each can be approximated by a parametric function of one or two parameters. The use of this parametric form intrinsically imposes a constraint on the blur function. The small number of parameters involved in the parametric blur function makes the resulting optimization problem tractable. The above formulation for the restoration from a single image is then extended to the blind restoration from an image sequence by introducing motion parameters into the multi-frame data constraints. An iterative alternating numerical system is developed to solve the nonlinear optimization problem. Each iteration of the alternating numerical algorithm involves the Fourier preconditioned conjugate gradient iterations to update the restored image and quasi-Newton steps to update the blur and motion parameters. Some experimental results are shown to demonstrate the usefulness of the present invention.

Figure 1:
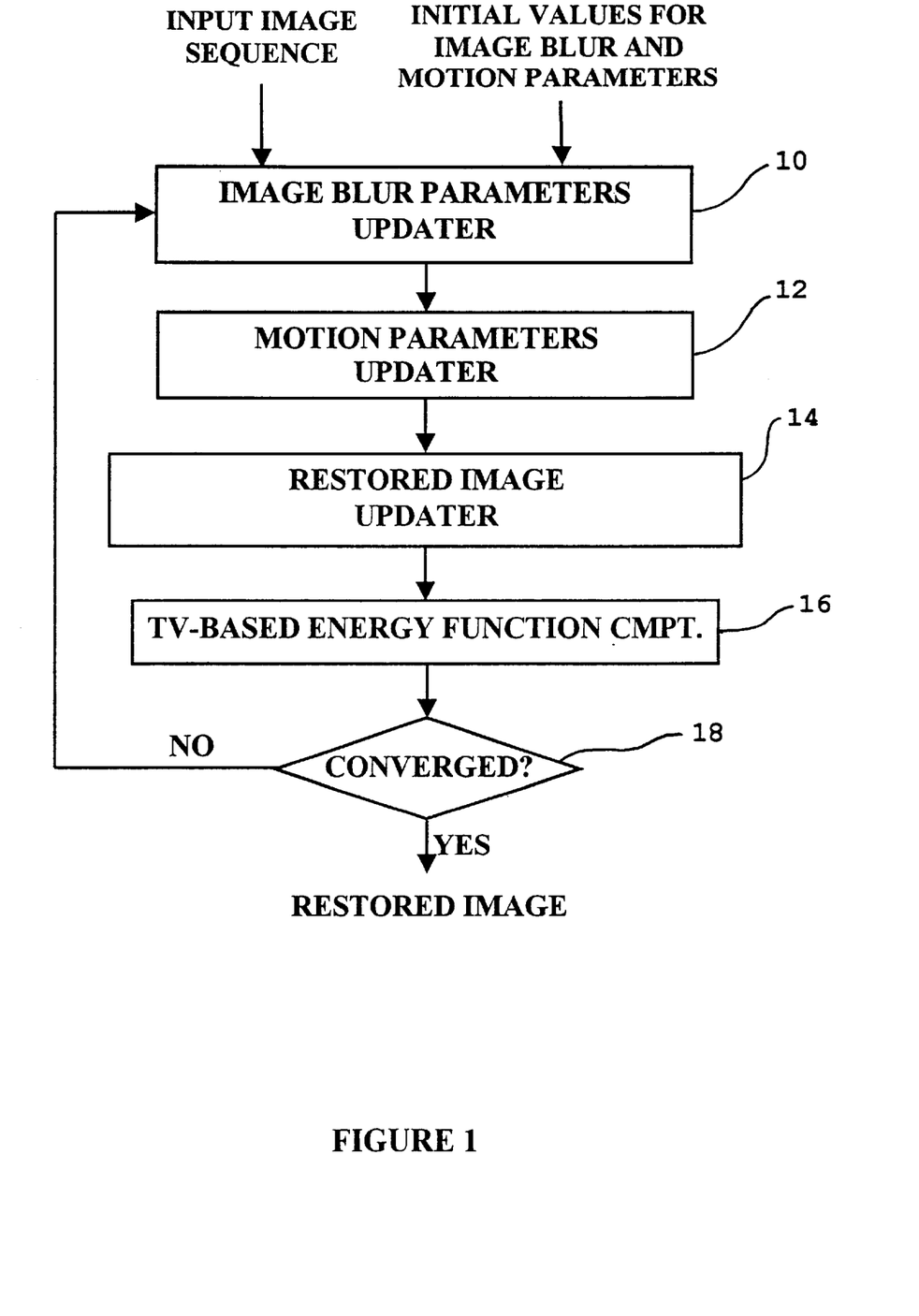
FIG. 1 illustrates a flow diagram of the present invention.

FIG. 1 illustrates a flow diagram of the present invention. The input to the blind image restoration system of the present invention contains an image sequence and initial values for image blur and motion parameters. Within image blur parameters updater 10, the system first updates the image blur parameters by using Quasi-Newton iterations to minimize the energy function with the motion parameters and restored image, fixed with their current values. After that, the signal flows to motion parameters updater 12 where the motion parameters between subsequent frames in the image sequence are updated by using Newton iterations to minimize the energy function with the blur parameters and restored image, fixed with their current values. The restored image is then updated in restored image updater 14 by using a preconditioned conjugate gradient algorithm to minimize the energy function derived from the total variational (TV) regularization formulation. The TV-based energy function is then computed in the TV-based energy function computer 16 by using the currently updated parameter values. Within converged decider 18, if the relative difference between the current energy function value and the energy value computed in the previous iteration is within a threshold, then it is converged and the restored image is outputted. If it has not converged, the signal flows back to image blur parameters updater 10 to update the parameters.

The following will describe TV formulation for blind image restoration. Due to the insufficient information in the blind image restoration problem, the blur function to be recovered has been constrained by using the standard $H^1$ norm regularization or the total variation norm regularization in a regularization framework. A large window size for the blur function needs to be determined in order to accommodate most types of blurs prior to applying the regularized blind restoration process. The large numbers of unknowns in both the image and the blur makes the resulting coupled optimization problem intractable. The energy minimization process may be easily trapped in a local minimum when the initial guess is far away from the true solution. To amend this problem, it is assumed that the blur function is a convolution of a Gaussian defocus blur and a uniform motion blur, which are the most common blurs encountered in the acquisition of image/video sequences. Since both of the Gaussian defocus blur and uniform motion blur can be represented by the parametric function of one and two parameters, these parametric forms well constrain the solution space of the blur function and make the resulting optimization problem very tractable.

The blur function $h_{\sigma,s,\theta}(x,y)$ considered in this paper has the following form $$h_{\sigma,s,\theta}(x,y) = G_\sigma(x,y) \hat{X} M_{s,\theta}(x,y) \quad (1)$$

where the Gaussian defocus blur function $G_\sigma(x,y)$ and the uniform motion blur $M_{s,\theta}(x,y)$ are given by $$G_\sigma(x,y) = \frac{1}{2\pi\sigma^2} e^{-\frac{x^2+y^2}{2\sigma^2}}$$

$$M_{s,\theta}(x,y) = r_s\left(\frac{x\cos\theta - y\sin\theta}{s}\right)\delta(x\sin\theta + y\cos\theta)$$

Note that $\delta$ is the Delta function and $r_s$ is the rectangular function defined as follows $$r_s(x) = \begin{cases} \frac{1}{s} & 0 \leq x \leq s \\ 0 & \text{elsewhere} \end{cases} \quad (2)$$

Substituting $G_\sigma(x,y)$ and $M_{s,\theta}(x,y)$ from their definitions given above into Equation 1, the composite blur function $h_{\sigma,s,\theta}(x,y)$ can be rewritten as $$\int_{-\infty}^{\infty}\int_{-\infty}^{\infty} G_\sigma(x-\tau, y-\eta) r_s\left(\frac{\tau\cos\theta - \eta\sin\theta}{s}\right) \delta(\tau\sin\theta + \eta\cos\theta) d\tau d\eta \quad (3)$$

The change of variables $\tau'=\tau\cos\theta-\eta\sin\theta$ and $\eta'=\tau\sin\theta+\eta\cos\theta$ is applied into Equation 3 to simplify the expression for the blur function $h_{\sigma,s,\theta}(x,y)$ as follows, $$h_{\sigma,s,\theta}(x, y) =$$

$$\int_{-\infty}^{\infty}\int_{-\infty}^{\infty} G_\sigma(x-\tau'\cos\theta - \eta'\sin\theta, y+\tau'\sin\theta - \eta'\cos\theta) r_s\left(\frac{\tau'}{s}\right)\delta(\eta')$$

$$d\tau' d\eta' = \frac{1}{2\pi\sigma^2 s}\int_0^s e^{-\frac{(x-\tau'\cos\theta)^2 + (y+\tau'\sin\theta)^2}{2\sigma^2}} d\tau' =$$

$$\frac{e^{-\frac{x^2+y^2-(x\cos\theta - y\sin\theta)^2}{2\sigma^2}}}{\sqrt{2}\pi\sigma s} \int_{(-x\cos\theta + y\sin\theta)/\sqrt{2}\sigma}^{(s-x\cos\theta + y\sin\theta)/\sqrt{2}\sigma} e^{-\gamma^2} d\gamma$$

Then the blur function $h_{\sigma,s,\theta}(x,y)$ can be rewritten as $$h_{\sigma,s,\theta}(x,y) = \phi_{\sigma,s,\theta}(x,y) \quad (4)$$

where $\phi_{\sigma,s,\theta}(x,y)$ and $\varphi_{\sigma,s,\theta}(x,y)$ are given as follows $$\phi_{\sigma,s,\theta}(x, y) = \frac{1}{\sqrt{2\pi}\sigma s} e^{-\frac{x^2+y^2-(x\cos\theta - y\sin\theta)^2}{2\sigma^2}} \quad (5)$$

$$\varphi_{\sigma,s,\theta}(x, y) = \int_{(-x\cos\theta + y\sin\theta)/\sqrt{2}\sigma}^{(s-x\cos\theta + y\sin\theta)/\sqrt{2}\sigma} e^{-\gamma^2} d\gamma \quad (6)$$

By assuming the blur function is of the above parametric form and constraining the true image with the TV regularization, the following variational formulation for the blind image formulation is obtained.

$$\min_{\sigma,s,\theta,f} \int\int_\Omega (h_{\sigma,s,\theta}(x, y) \otimes f(x, y) - g(x, y))^2 + \alpha|\nabla f(x, y)| dx dy \quad (7)$$

where $g(x,y)$ is the observed image function, $f(x,y)$ is the estimated image function, $\alpha$ is the regularization parameter.

To solve the above minimization problem, first the image function $f(x,y)$ is discretized by the finite difference method or finite element method. Then this leads to the minimization of the following energy function $$\|H(\sigma, s, \theta)f - g\|^2 + \alpha \sum_{i=1}^m \sum_{j=1}^n \sqrt{(f_{i,j} - f_{i-1,j})^2 + (f_{i,j} - f_{i,j-1})^2} \quad (8)$$

with respect to $\sigma,s,\theta$ and $f$. Note that the symbol $\|\ \|$ is the $l_2$ norm, $f$ is the concatenation vector of the nodal variables $f_{i,j}$ obtained from the discretization of the true image function $f(x,y)$, $g$ is the vector concatenated from the observed image values, and $H(\sigma,s,\theta)$ is the matrix for convolution with the kernel function $h_{\sigma,s,\theta}(x,y)$.

The following will describe an extension to the blind image sequence restoration. The TV regularization formulation described above is for the joint blur identification and image restoration from a single image. In this section, this formulation is extended to the blind image restoration from an image sequence. This allows for the integration of coherent information from an image sequence to reliably solve the blind image restoration problem.

To incorporate more frames in the image sequence into the formulation, the first image is used as the reference frame and a motion model is introduced to relate the pixel locations in the reference frame to locations in other frames. To be more specific, the image frame $g_k(x,y)$ in the sequence observed at time $t_k$ is related to the true image $f(x,y)$ at time $t_0$ through a coordinate transformation $T^{(k)}(x,y)=(T_x^{(k)}(x,y), T_y^{(k)}(x,y))$ as follows:

$$g_k(T^{(k)}(x,y)) = h(x,y) \hat{\otimes} f(x,y) \quad (9)$$

where $h(x,y)$ is the blur function to be identified. As discussed above, the blur function considered in this paper is assumed to be a combination of Gaussian blurring and uniform motion blurring. By choosing the reference frame at time $t_0$, $T^{(0)}(x,y)=(x,y)$ is obtained.

By using the coordinate transformation $T^{(k)}$ to relate the observed image $g_k(x,y)$ to the true image $f(x,y)$, the formulation for the blind image restoration from an image sequence can be rewritten as the minimization of the following functional $$\int\int_\Omega \sum_{k=0}^K (h_{\sigma,s,\theta}(x, y) \otimes f(x, y) - g_k(T^{(k)}(x, y)))^2 + \alpha|\nabla f(x, y)| dx dy \quad (10)$$

for the unknowns $\sigma,s,\theta,f,T^{(1)},K,T^{(K)}$. The optimization problem given in Equation 10 is ill posed since no constraint was placed on the transformations $T^{(k)}$, $k=1,K,K$. In general, the distributed representation can be used, i.e. optical flow field $(u^{(k)}(x,y),v^{(k)}(x,y))$ for the transformation $T^{(k)}$ and traditional regularization can be applied to impose smoothness constraints on it. Then the well-posed optimization problem is to minimize the following energy function $$\sum_{k=0}^K \int\int_\Omega (h_{\sigma,s,\theta}(x, y) \otimes f(x, y) - g_k(x + u^{(k)}(x, y), y + v^{(k)}(x, y)))^2 \quad (11)$$

$$dx dy + \lambda \sum_{k=1}^K \int\int_\Omega |\nabla u^{(k)}(x, y)|^2 +$$

$$|\nabla v^{(k)}(x, y)| dx dy + \alpha \int\int_\Omega |\nabla f(x, y)| dx dy$$

over the unknowns $\sigma,s,\theta,f,u^{(1)},K,u^{(K)},v^{(1)},K,v^{(K)}$. Note that the smoothness constraint for the flow field can also be imposed along the time direction to make the above formulation even more well constrained. To solve the above optimization problem, the image function $f(x,y)$ must be discretized as well as the flow field $(u^{(k)}(x,y),v^{(k)}(x,y))$ using the finite difference method or the finite element method as mentioned above.

For many cases, it is important to restore a portion of an image that undergoes a global motion, such as restoring a license plate from an image sequence of a moving vehicle. For this example, it is assumed that the global motion model contains a vector of parameters $a$ and the transformation is denoted by $T_a$. Note that the dimension of the vector $a$ is very small. For the case of an affine motion, the vector $a$ has six elements. The formulation for using the global motion leads to the minimization of the following energy functional $$\int\int_\Omega \sum_{k=0}^K (h_{\sigma,s,\theta}(x, y) \otimes f(x, y) - g_k(T_{a_k}(x, y)))^2 + \alpha|\nabla f(x, y)| dx dy \quad (12)$$

where $a_k$ is the global motion model parameters for the k-th frame and the motion parameter vector $a_0$ for the 0-th frame is the set of parameters that yield the identity transformation, i.e. $T_{a_0}(x,y)=(x,y)$. No regularization is needed for the motion parameters here since the global motion model already constrains the motion field very well.

The following will describe an alternating numerical minimization system developed for solving the optimization problem of blind image restoration from the image sequence given above. The unknowns in this blind image sequence restoration problem consist of the blur function parameters $\sigma,s,\theta$, the motion parameters $a_k$, k=1,K,K, and the restored image f. The coupling of these different types of unknowns makes this optimization problem difficult to solve. One popular approach to this kind of problem is the alternating scheme. The basic idea of the alternating numerical scheme is to update different types of unknowns alternatively to achieve an efficient update. Thus the alternating scheme of the present invention consists of the following three steps in each iteration.

1. Update $f^{(p)}$ by minimizing the energy function given in Equation 12 with the unknowns $\sigma,s,\theta$ and $a_k$ fixed with their currently updated values, i.e. $\sigma^{(p-1)}, s^{(p-1)}, \theta^{(p-1)}$ and $a_k^{(p-1)}$.
2. Update $\sigma^{(p)}, s^{(p)}$ and $\theta^{(p)}$ with one quasi-Newton iteration [11] for the above energy function with the unknowns f and $a_k$ replaced by their current values, i.e. $f^{(p)}$ and $a_k^{(p-1)}$. The quasi-Newton iteration is further described by J. E. Dennis and R. B. Schnabel in *Numerical Methods for Unconstrained Optimization and Nonlinear Equations*, Prentice-Hall, New Jersey, 1983.
3. Update $a_k^{(p)}$ by solving the minimization problem given in Equation 12 with the unknowns $\sigma,s,\theta$ and f fixed with their currently updated values, i.e. $\sigma^{(p)}, s^{(p)}, \theta^{(p)}$ and $f^{(p)}$.

The first step involves the update of the restored image with the blurring parameters and the motion parameters fixed at their current values. This step is similar to the traditional regularized image restoration with given blur function. The main difference is the use of total variational regularization here instead of the standard $H^1$ norm regularization in the traditional image restoration problem. Several methods have been proposed to speed up the convergence of the numerical solution for the resulting nonlinear PDE. These methods are described by T. F. Chan and C. K. Wong in "Total Variation Blind Deconvolution", IEEE Trans. Image Processing, Vol. 7, No. 3, pp. 370–375, 1998 and by P. Blomgren, T. F. Chan, P. Mulet, and C. K. Wong in "Total Variation Image Restoration: Numerical Methods And Extensions", Proc. of International Conf. on Image Processing, pp. 384–387, Santa Barbara, Calif., 1997. The present invention includes a Fourier preconditioning technique in conjunction with the conjugate gradient scheme to update the restored image f. The conjugate gradient scheme is further described by G. H. Golub and C. F. Van Loan in Matrix Computations, The Johns Hopkins University Press, $2^{nd}$ ed., 1989. Since the convergence for the minimization with respect to f usually takes longer due to its large number of unknowns, ten iterations of the preconditioned conjugate gradient algorithm are applied to update the restored image in this step.

Step 2 is the update of the blur function parameters. One quasi-Newton iteration is used here to make sure the energy is reduced after the update through the direction provided by the Newton method. The last step in the system is the update for the motion parameters. For the global motion model considered in this example, one quasi-Newton update was employed in this step.

Since the energy function to be minimized is non-convex, the present invention requires a good initial guess especially for the blur function parameters and the motion parameters. Otherwise, the numerical algorithm may converge to a local minimum solution. A good initial guess for the motion parameters can be easily obtained from the computation of optical flow. An initial guess for the blur function parameters can also be obtained from the motion information and the image acquisition condition.

The following will describe some experimental results for using the present invention to solve the blind image restoration problem. The results of applying the present invention for the blind restoration of a single blurred image are shown in FIG. 2. The experiment for the image restoration from a license plate image sequence is shown in FIG. 5.

Figure 2A:
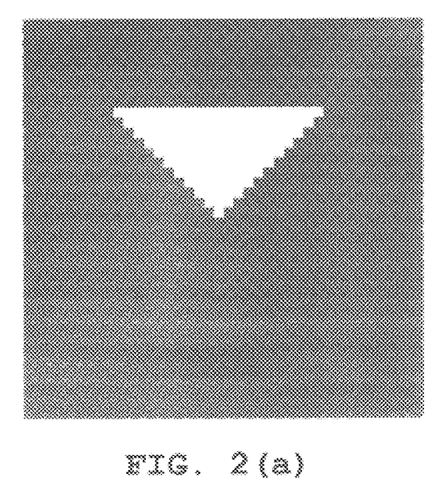
Figure 2B:
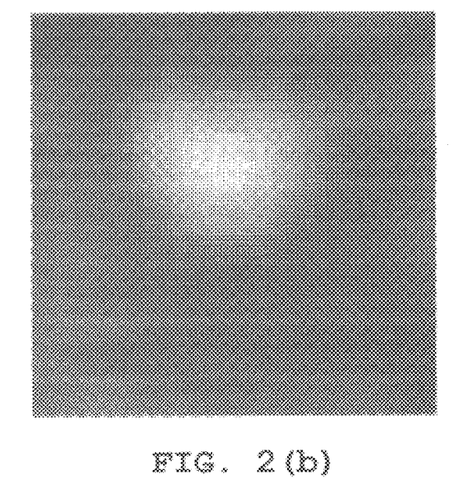
FIG. 2(b) illustrating a blurred image.
Figure 2C:
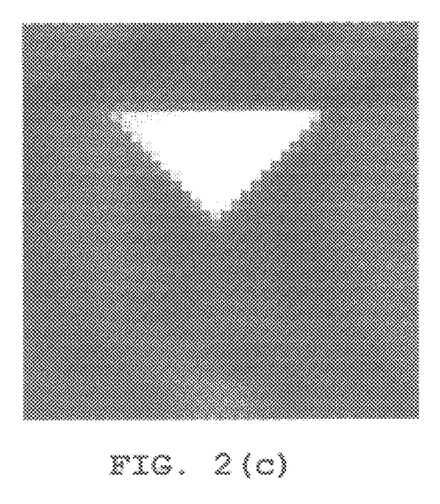
FIG. 2(c) illustrating a TV restored image.
Figure 2D:
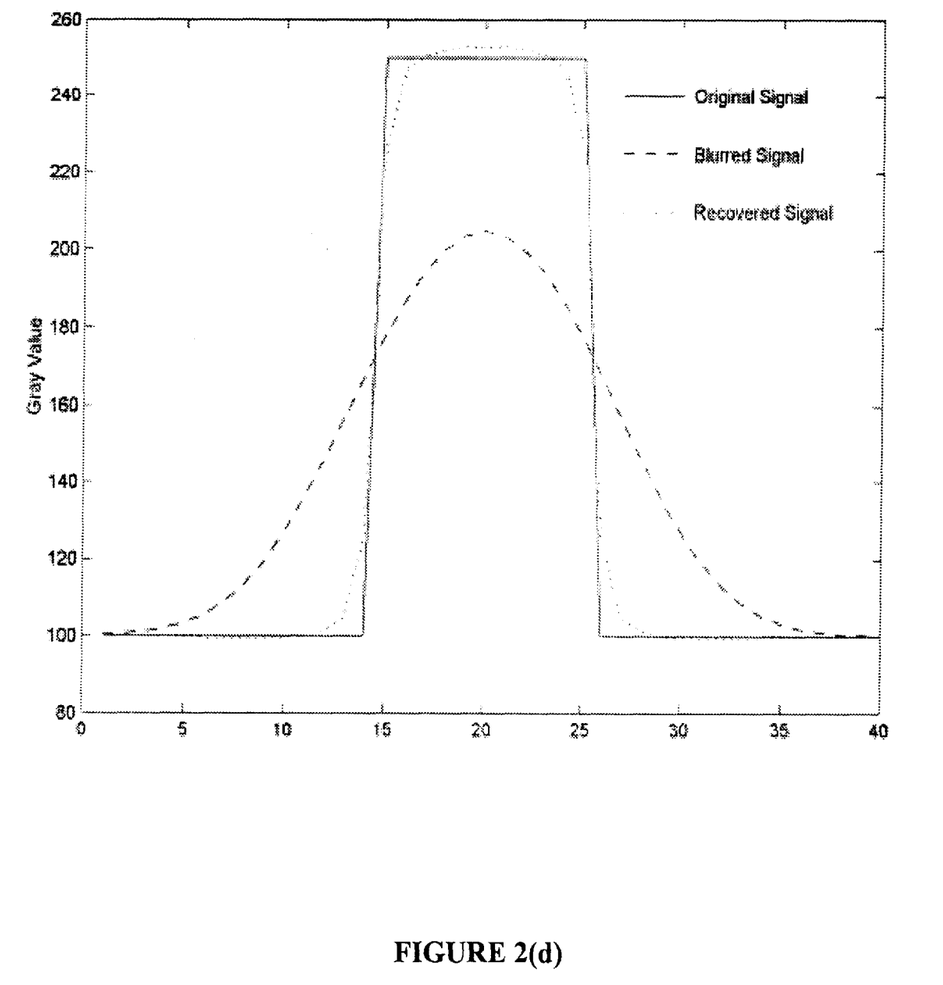
FIG. 2(d) illustrating profiles of all of the three images at the same row.

For the first experiment, a simulated triangular image as shown in FIG. 2(a) was used as the original true image. The size of the image is 40×40. A Gaussian blur with $\sigma=3.5$ and a uniform motion blur with s=4.0 and $\theta=0$ are applied to the original image to generate the blurred image shown in FIG. 2(b). FIG. 2(c) shows the TV regularized solution that is obtained after thirty iterations of the preconditioned conjugate gradient system. The profiles of the original image, the blurred image and the recovered image at row 15 are depicted in FIG. 2(d). From this experiment, it is shown that the TV regularized solution preserves discontinuities very well in the recovered solution.

Figure 3A:
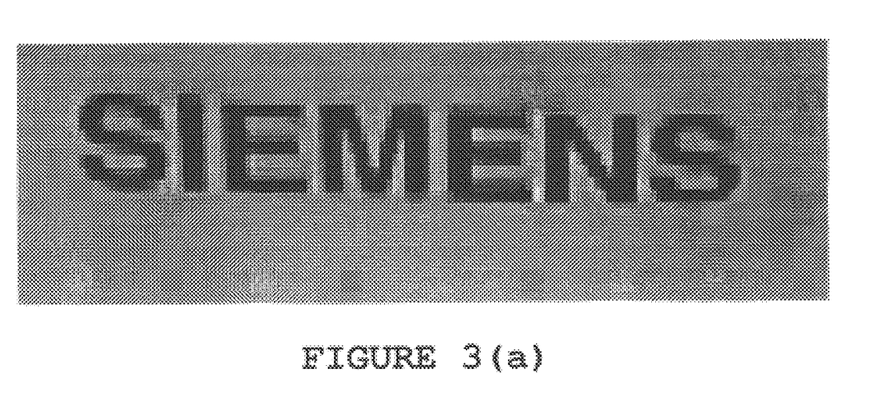
Figure 3B:
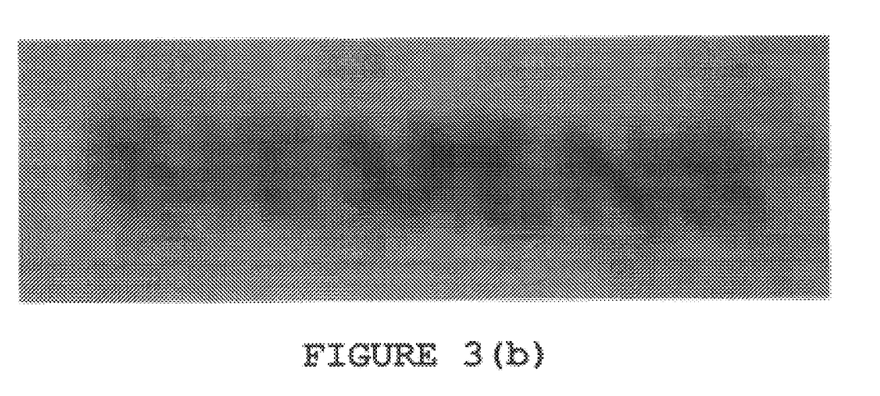
FIG. 3(b) illustrating a blurred image.
Figure 3C:
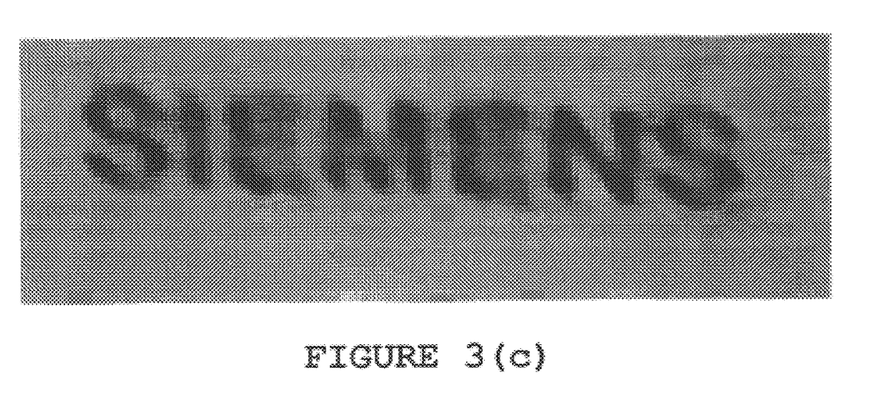
FIG. 3 illustrates simulated image examples with FIG. 3(a) illustrating an original image.
Figure 4:
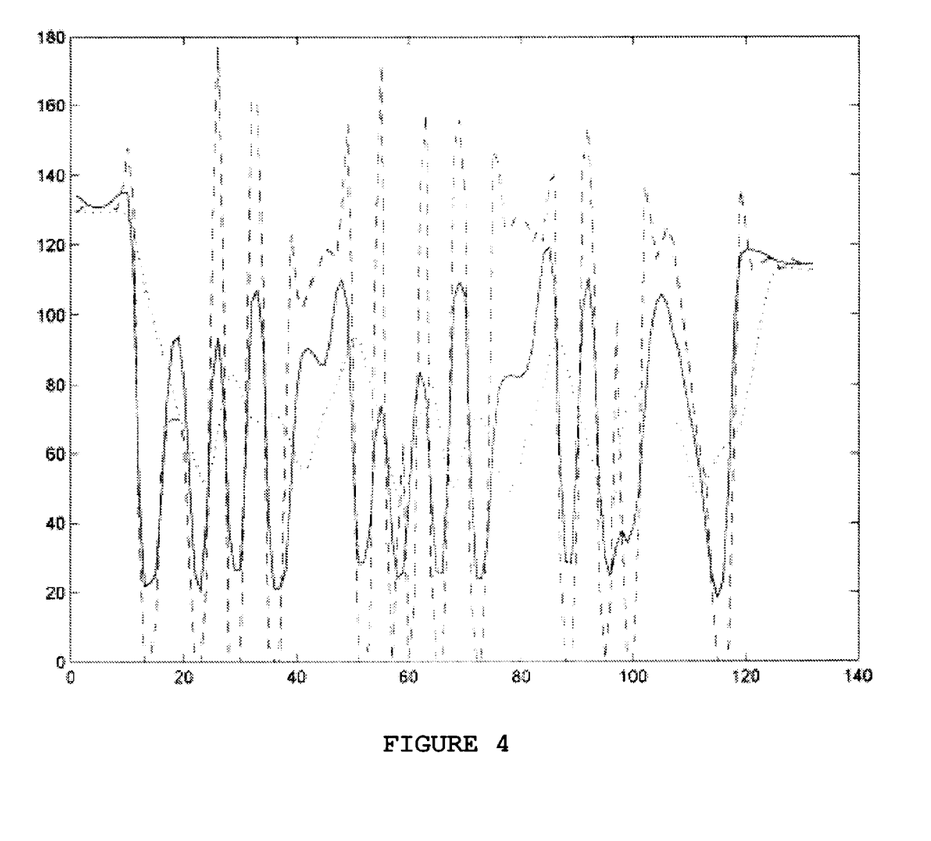
FIG. 4 illustrates profiles of the original, the blurred and the restored images of FIG. 3, at the same row. The dashed, the dotted and the solid curves depict profiles of the original image, the blurred image and the restored image, respectfully.

In the second experiment, a blurred image, as shown in FIG. 3(b) is generated by convolving a blur function (s=10.0, $\sigma=1.5$ and $\theta=-\pi/4$) with the original well-focused real image shown in FIG. 3(a). The restored image obtained after thirty iterations of the alternating system is shown in FIG. 3(c). The profiles of the original image, the blurred image, and the restored image, at the same row of the image, are depicted in FIG. 4. It can be seen that the restored image provides much better contrast and details than the blurred image.

Figure 5A:
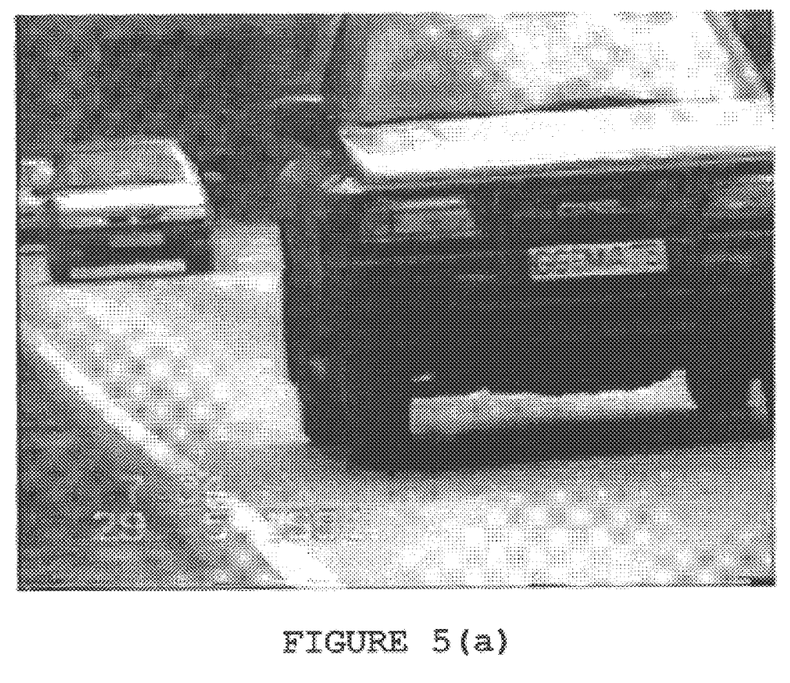

FIG. 5 illustrates restoration of a license plate from an image sequence. Automatic recognition of car license plates plays an important role in traffic surveillance systems. In many of these applications, there is a requirement that the entire car should be visible. Therefore, the resolution of the characters on the plate is very low. To make the problem even worse, the license plate images acquired from a moving car are blurred due to motion blurring. One frame of a car sequence is shown in FIG. 5(a). In this experiment, the present invention was applied to restore license plate images from a video sequence of a moving car.

Prior to applying the present invention to extract characters from the license plates, the license plate has to be localized in each frame of a sequence. The details of the localization are presented by Y. Cui and Q. Huang in "Extracting Characters Of License Plates From Video Sequences", Machine Vision and Applications, Vol. 10, No. 5/6, pp. 308–320, 1998. Since the vehicle is moving and the view of the camera is not necessarily perpendicular to the incoming vehicle, the license plates from different frames are not only different sizes but also have different perspective distortion. A well-known planar surface motion model is used to correct the distortion. For any pixel at location (x,y), it can be mapped to a new location (x',y') using a planar surface motion model, i.e. $(x', y40) = T_a(x,y)$ and $$x'=x+p_1 x+p_2 y+p_5+p_7 x^2+p_8 xy$$
$$y'=y+p_3 x+p_4 y+p_6+p_7 xy+p_8 y^2 \quad (13)$$

This is further described by G. Adiv in "Determining Three-dimensional Motion And Structure From Optical Flow Generated By Several Moving Objects", IEEE Tran. Pattern Analysis Machine Intelligence, Vol. 7, No. 4, pp. 384–401, 1985. Thus the motion parameter vector a is given by $(p_1, K, p_8)$.

Figure 5B:
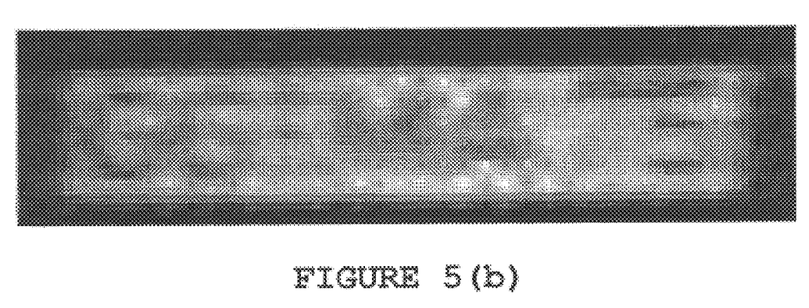
FIG. 5(b) illustrating a warped image of the license plate region from the frame.
Figure 5C:
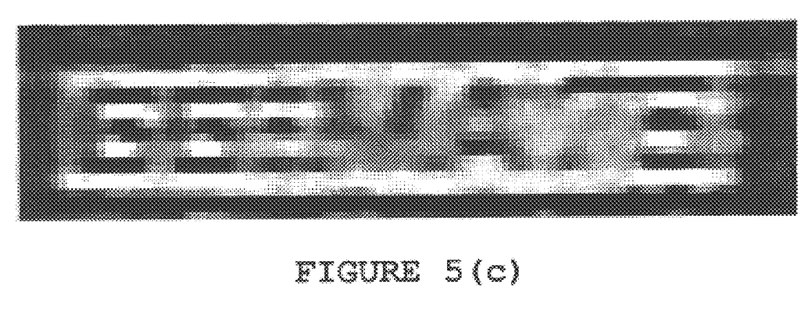
FIG. 5(c) illustrating a TV restored image.
Figure 6:
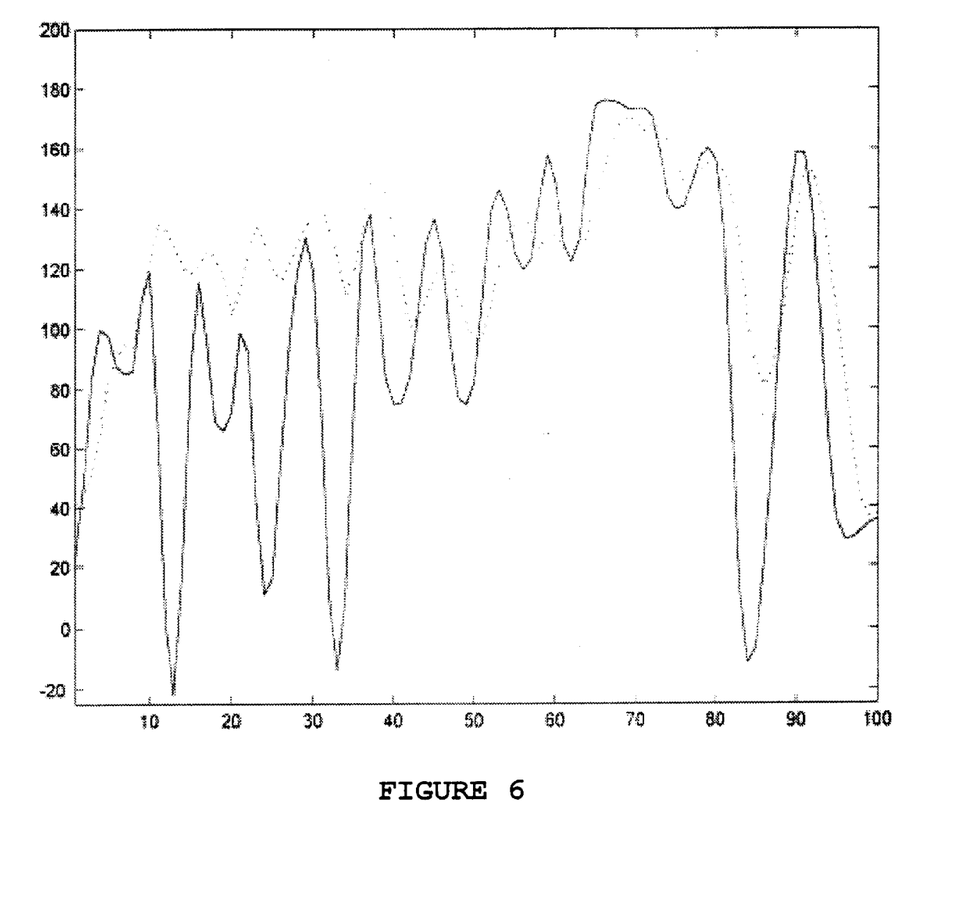
FIG. 6 illustrates profiles of the blurred and the restored images of FIG. 5, at the same row. The dotted and the solid curves are the profiles of the blurred image and the restored image, respectfully.

FIG. 5(b) is a blurred image warped from the license plate region in a frame of the car image sequence shown in FIG. 5(a). By applying the TV blind restoration system of the present invention, the restored image after fifty iterations of the alternating numerical system is shown in FIG. 5(c). The profiles of the blurred image and the restored image at the same row are depicted in FIG. 6. It is obvious that the image contrast is much better improved. However, the restoration in the middle-right region of the image does not improve the contrast very much. This is probably due to the restriction on the use of the spatially invariant blur function. In reality, the image may be caused by the spatially varying blurring effect. To avoid this problem, the present invention should be extended to spatially varying blur functions.

In summary, the present invention includes an efficient and practical system for blind image restoration from an image sequence. The invention is based on using the TV regularization for enforcing smoothness constraints on the true image function. The TV regularization allows for discontinuities to exist in the image function, thereby achieving edge-preserving smoothing. The blur function is a combination of a Gaussian defocus blur and a uniform motion blur and each can be approximated by a parametric function of one or two parameters. These two types of blurring are most common in the image degradation process. The use of this parametric form intrinsically imposes a constraint on the blur function. The small number of parameters involved in the parametric blur function makes the resulting optimization problem tractable. The formulation is then extended to the blind restoration from an image sequence by introducing motion parameters into the multi-frame data constraints. An iterative alternating numerical system is developed to solve the nonlinear optimization problem. Some experimental results are shown to demonstrate the usefulness of the present invention.

It is not intended that this invention be limited to the hardware or software arrangement, or operational procedures shown disclosed. This invention includes all of the alterations and variations thereto as encompassed within the scope of the claims as follows.

What is claimed is:

1. A total variational blind image restoration from image sequence system comprising:
   an image blur parameters updater for receiving an input image sequence and initial values for image blur and motion parameters;
   a motion parameters updater connected to said image blur parameters updater;
   a restored image updater connected to said motion parameters updater;
   a TV-based energy function computer connected to said restored image updater for calculating energy function values; and
   a converged decider connected to said TV-based energy function computer and said image blur parameters updater for providing a restored image when energy function values are determined to have converged.

2. The system according to claim 1, wherein the energy function values are determined to have converged when values of a current energy function is within a predetermined threshold as compared to values of the preceding energy function.

3. An image restoration system receiving in sequence an image signal containing restored image and image blur and motion parameters, the system comprising:
   a first updater for receiving the image signal and initial values for the image blur and motion parameters and for updating the image blur and motion parameters in a current iteration by minimizing energy function with the image blur and motion parameters and the restored image;
   a second updater for updating the restored image in a current iteration by minimizing energy function with the image blur and motion parameters updated in the first updater;
   a computing device for computing energy function value of the image signal with the image blur and motion parameters updated in the first updater and the restored image updated in the second updater; and
   a decider for having the image signal with the image blur and motion parameters and the restored image updated in the first and second updaters respectively flow back to the first updater until the energy function value converges to a predetermined threshold.

4. The system as defined in claim 3, wherein the first updater includes:
   an image blur parameters updater including means for updating the image blur parameters in a current iteration by minimizing the energy function with the motion parameters and the restored image which are fixed with their current values; and
   a motion parameters updater including means for updating the motion parameters in a current iteration by minimizing the energy function with the image blur parameters and the restored image which are fixed with their current values.

5. The system as defined in claim 4, wherein the motion parameters in a current iteration represent the motion parameters between subsequent frames in a sequence of the image signal.

6. The system as defined in claim 3, wherein the second updater employs total variational regularization to update the restored image.

7. The system as defined in claim 3, wherein the second updater employs total variational norm for smoothness constraint on image blur of the image signal.

8. The system as defined in claim 3, wherein the second updater employs a preconditioned conjugate gradient algorithm in performing iterations to minimize the energy function with the image blur and motion parameters.

9. The system as defined in claim 4, wherein the image blur parameter updater employs Quasi-Newton iterations to minimize the energy function with the motion parameters and the restored image.

10. The system as defined in claim 5, wherein the motion parameter updater employs Newton iterations to minimize the energy function with the image blur parameters and restored image.

11. The system as defined in claim 3, wherein the decider includes:
   a calculator for producing differences between the energy function value computed in the current iteration and the energy function value computed in the previous iteration; and
   a comparator for comparing the differences produced by the calculator with a predetermined threshold, wherein the image signal from the decider flows back to the first updater when the difference is bigger than the predetermined threshold.

12. A method for recovering an original image signal from a blurred image signal comprises the steps of:
   (a) receiving in sequence a image signal with restored image and image blur and motion parameters;

(b) updating the image blur and motion parameters of the image signal in a current iteration by minimizing energy function with the image blur and motion parameters and the restored image;

(c) updating the restored image of the image signal in a current iteration by minimizing energy function with the image blur and motion parameters updated in the step (b);

(d) computing energy function value of the image signal with the image blur and motion parameters updated in the step (b) and the restored image updated in the step (c); and (e) comparing the energy function value with a predetermined threshold value and if the energy function value is larger than the threshold, repeating the steps (b) to (d) until the energy function value converges to equal or less than the threshold.

13. The method as defined in claim 12, wherein the step (b) includes the steps of:

(b1) updating the image blur parameters in a current iteration by minimizing the energy function with the motion parameters and the restored image; and (b2) updating the motion parameters in a current iteration by minimizing the energy function with the image blur parameters and the restored image.

14. The method as defined in claim 12, wherein the step (c) includes the step of performing total variational regularization to minimize the energy function with the image blur and motion parameters.

15. The method as defined in claim 12, wherein the step (c) employs total variational norm for smoothness constraint on image blur of the image signal.

16. The method as defined in claim 12, wherein the step (c) employs a preconditioned conjugate gradient algorithm in performing iterations to minimize the energy function with the image blur and motion parameters.

17. The method as defined in claim 16, wherein the preconditioned conjugate gradient algorithm includes use of:

$$\int\int_\Omega \sum_{k=0}^{K} [h_{\sigma,s,\theta}(x,y) \otimes f(x,y) - g_k\{T_{ak}(x,y)\}]^2 + \alpha|\nabla f(x,y)|\,dxdy$$

wherein, h(x,y) is image blur function,
σ, s, and θ are image blur function parameters,
f(x,y) is image function,
$g_k\{T_a{}^k(x,y)\}$ is observed image function,
$T_a{}^k(x,y)$ is coordinate transformation, and
$a_k$ is a motion parameter for the $k_{th}$ frame.

18. The method as defined in claim 12, wherein the step (e) includes the steps of:

(e1) calculating difference between the energy function value computed in the current iteration and the energy function value computed in the previous iteration;

(e2) comparing the difference calculated in the step (e1) with a predetermined threshold; and (e3) having the image signal with the image blur and motion parameters updated in the step (b) and the restored image updated in the step (c) flow back to the step (b) when the difference calculated in the step (e1) is bigger than the predetermined threshold.

\* \* \* \* \*